Jan. 23, 1962    A. F. KRUEGER    3,018,131
SEATS COUPLED SIDE-BY-SIDE
Filed Sept. 27, 1960    6 Sheets-Sheet 1

*INVENTOR.*
ALLISON F. KRUEGER
BY
*Donald H. Sweet*
ATTORNEY

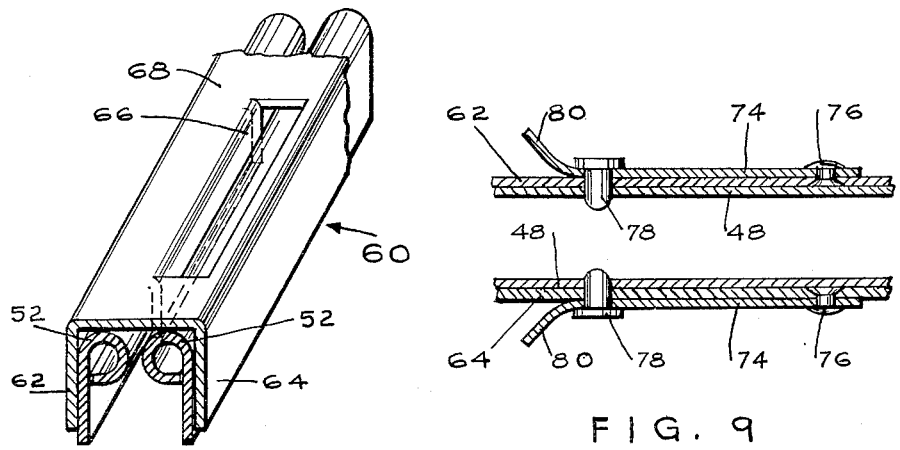
FIG. 6
FIG. 9
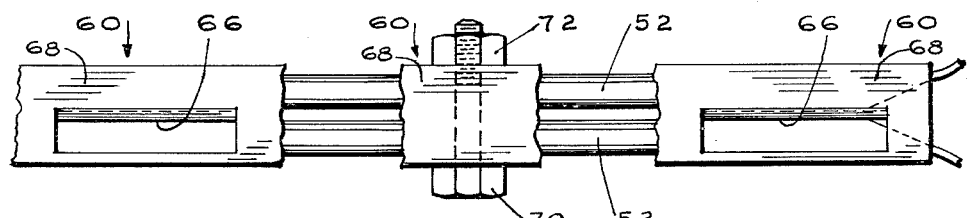
FIG. 7
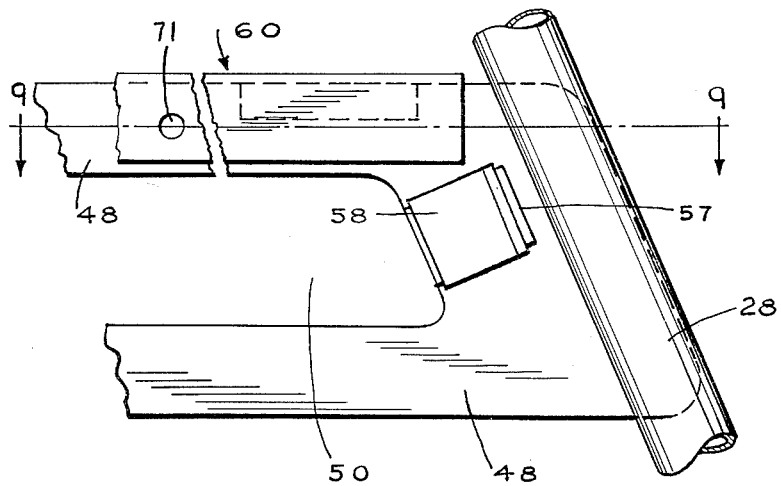
FIG. 8

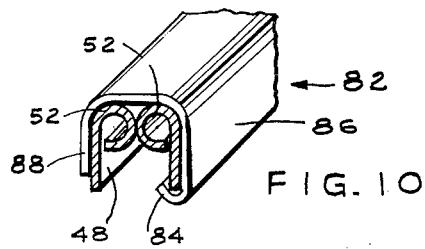
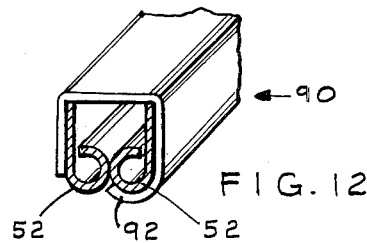
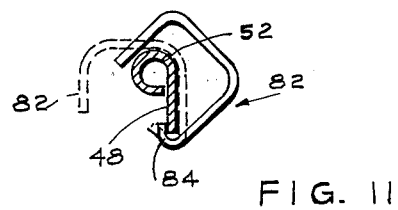
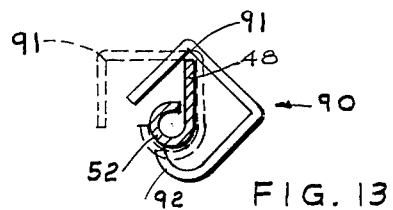
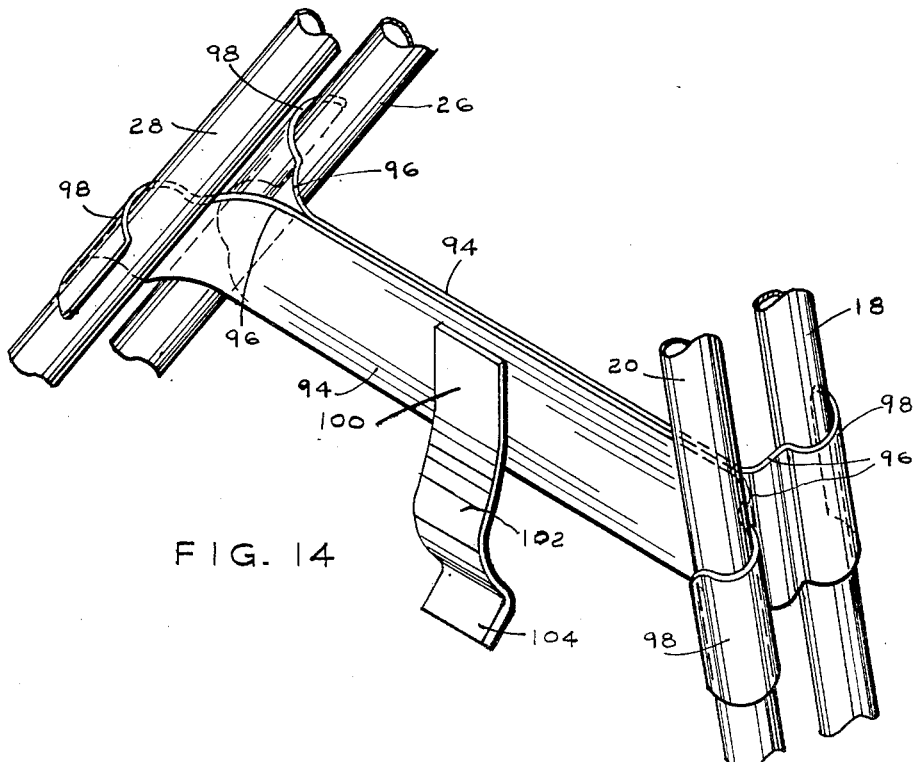

Jan. 23, 1962 A. F. KRUEGER 3,018,131
SEATS COUPLED SIDE-BY-SIDE
Filed Sept. 27, 1960 6 Sheets-Sheet 4
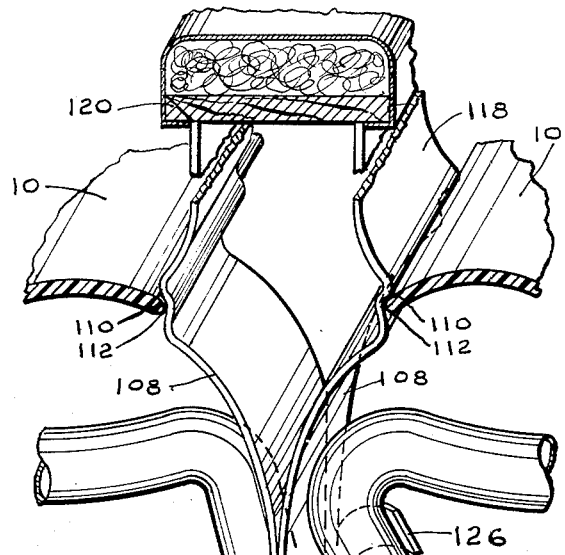
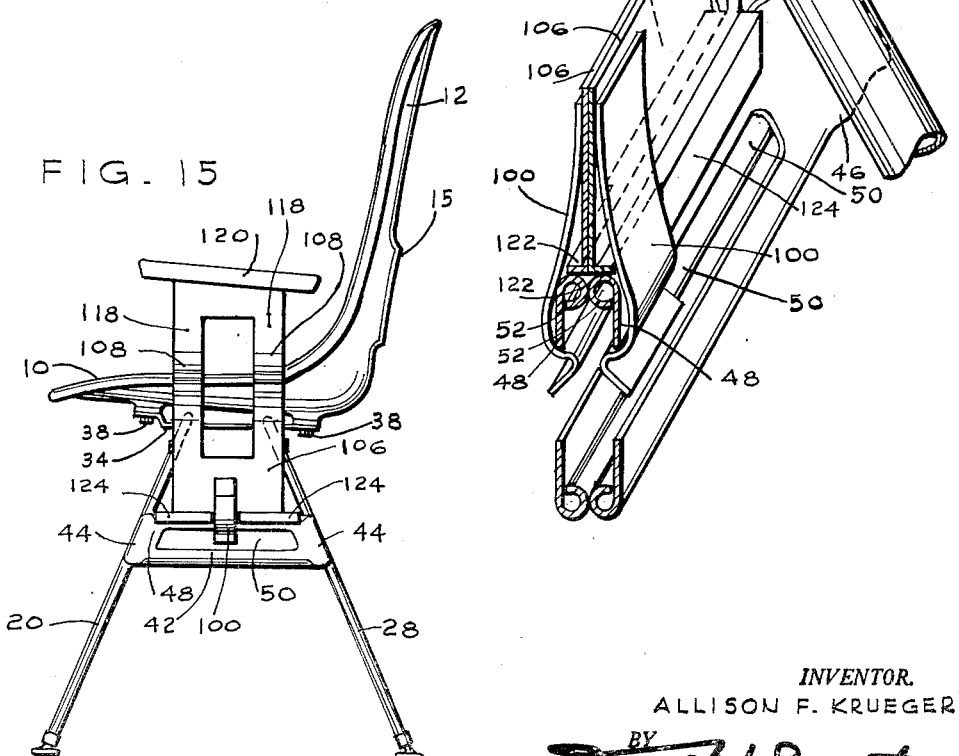
INVENTOR.
ALLISON F. KRUEGER
ATTORNEY Jan. 23, 1962  A. F. KRUEGER  3,018,131
SEATS COUPLED SIDE-BY-SIDE Filed Sept. 27, 1960  6 Sheets-Sheet 5

*INVENTOR.*
ALLISON F. KRUEGER

BY Donald H. Sweet

ATTORNEY

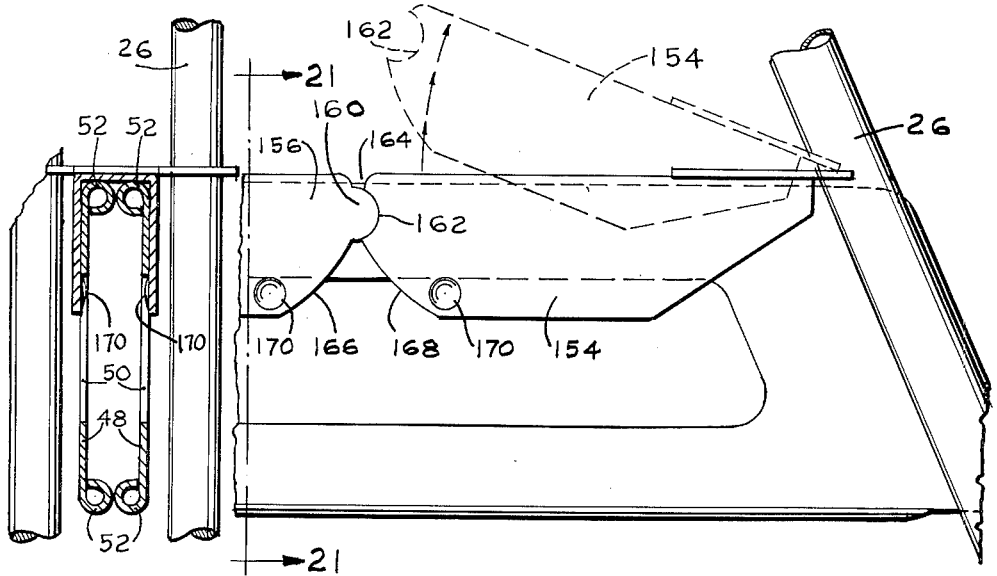
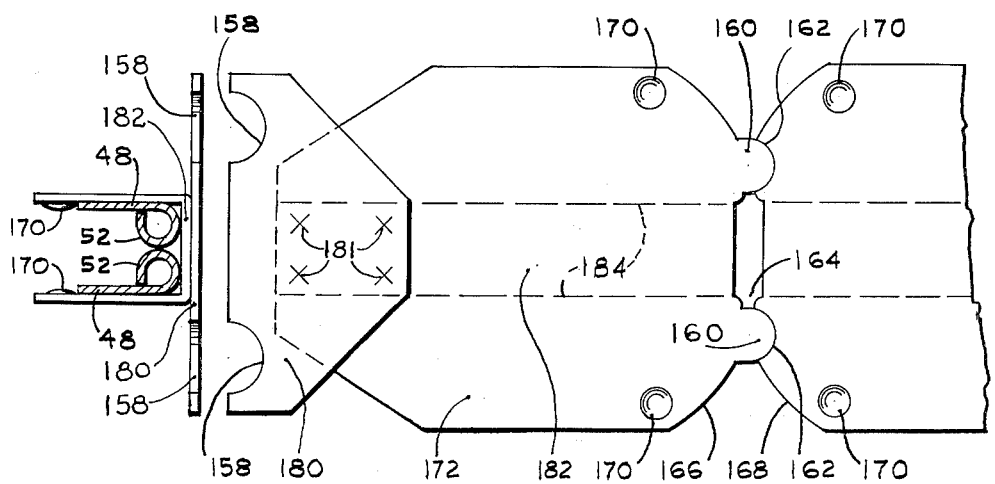

United States Patent Office 3,018,131
Patented Jan. 23, 1962

3,018,131
SEATS COUPLED SIDE-BY-SIDE
Allison F. Krueger, 226 Mir Mar Drive, Green Bay, Wis.
Filed Sept. 27, 1960, Ser. No. 58,686
5 Claims. (Cl. 297—248)

My invention relates to seating and includes among its objects and advantages the adaptation of a multiplicity of chairs to an increased variety of useful arrangements.

In the accompanying drawings:

FIGURE 6 is a similar view of a detachable ganging clip;

FIGURE 7 is a plan view of a complete clip according to FIGURE 6, indicating a simple permanent fastening means for the clip;

FIGURE 8 is a side elevation of the same clip and associated chair parts, without the fastening bolt;

FIGURE 9 is a fragmentary section, as on line 9—9 of FIGURE 8, indicating quick-detachable fastening means for the clip of FIGURE 8;

FIGURE 10 is a view, similar to FIGURE 5, of a quick detachable clip that may be assembled and separated by simple rotation;

FIGURE 11 is a view of the clip of FIGURE 10 in process of removal or installation;

FIGURE 12 is a view similar to FIGURE 10 showing a clip operating on the same principle but adapted to clamp the lower reaches of the cross braces rather than the upper;

FIGURE 13 is a view of the clip of FIGURE 12 in process of removal or installation;

FIGURE 14 is a perspective view of a quick detachable clip that engages the legs of the chairs rather than the side braces;

FIGURE 15 is a side view of a chair provided with a combined clip and arm rest;

FIGURE 16 is a fragmentary perspective view on an enlarged scale of the combined clip and arm rest of FIGURE 15;

FIGURE 20 is a partial side elevation of a quick-detachable toggle clip, and associated parts;

FIGURE 21 is a section on line 20—20 of FIGURE 19;

FIGURE 22 is a plan view of the sheet metal parts from which the clips of FIGURE 20 can be fashioned; and FIGURE 23 is an end elevation of the finished clip, with the chair parts to be clamped together shown in cross section.

Figure 1:
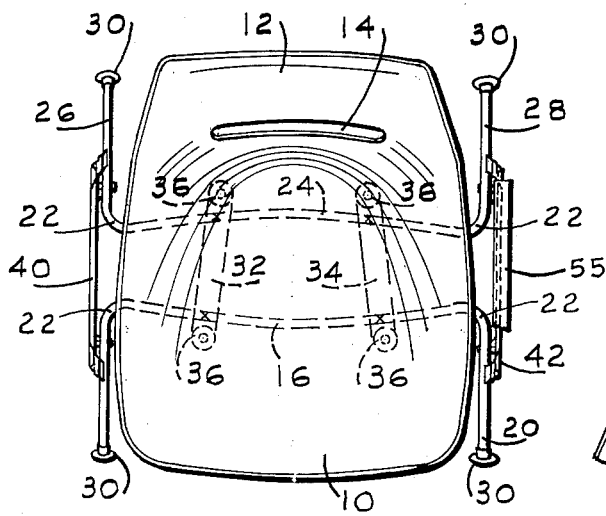
FIGURE 1 is a plan view and FIGURE 2 an elevation of a chair according to the invention.

In the embodiment selected to illustrate the invention, the chair proper may be any one of a variety of chairs of the type referred to as "stacking." I have illustrated a chair with a one-piece fiberglass seat and back, comprising the seat 10, having a shallow concavity opening upward, and the back 12, having a slight forward concavity. An aperture 14 provides desirable ventilation and permits the portion of the back above the aperture to have slightly greater flexibility, for the added comfort of the user. A narrow lip 15, curving rearwardly, along the edge of the aperture 14, provides a desirable strength increment, and a convenient hold for attachment of a cover, or of upholstery. Each chair includes supporting means underlying seat 10 comprising a front cross piece 16 curved to conform approximately to the curvature of the seat 10, and corner legs 18 and 20 integral with the cross piece 16 and joined thereto by gently curved arcuate portions 22 at the top. Each of the legs 18 and 20 is vertical when viewed from the front and forwardly inclined, as best shown in FIGURE 15, when viewed from the side. A duplicate cross piece 24 is positioned rearwardly of the cross piece 16 and carries integral corner legs 26 and 28.

The lower ends of all four legs may be provided with conventional floor engaging feet 30.

The front and rear cross pieces 16 and 22 may be united into a single substantially rigid frame, as by spot welding them to cross straps 32 and 34 extending forwardly and rearwardly, as best indicated in FIGURE 1. Each cross strap extends beyond its attachment to the cross piece at both ends and has an apertured end 36 adapted to engage an attachment bolt 38 projecting downwardly from the seat 10.

The supporting frame of each chair is completed by side braces, one on each side. I have illustrated a brace 40 connecting corner legs 18 and 26 and a similar brace 42 connecting legs 20 and 28, as best illustrated in FIGURE 15.

Each such brace includes inclined end plates each having an arcuate portion 44 (see FIGURES 4 and 15) adapted to conform accurately to the contour of an adjacent leg and spot welded to the leg. The plate 44 is continued in a narrow offset portion 46 which is also integral with the main brace plate portion 48, extending from one leg across to the other. The center of the plate portion 48 is cut away to leave a window 50 and the upper and lower edges of the plate are rolled around outward and then back into contact with the body of the plate to define fairly large circular beads 52 to strengthen and stiffen the entire structure. These beads also provide double abutments of considerable fore-and-aft extent, when a plurality of chairs are ganged side by side.

Stacking

Means are provided on each chair at both ends of both side braces to engage the inclined legs of a superposed chair and support a superposed chair firmly, with the seat member of the superposed chair about three or four inches higher than that of the lower chair. In this way 12 or 15 chairs can easily be stacked one above the other and the entire stack will be higher than an individual chair, only by the number of chairs minus one, multiplied by the spacing of three or four inches between successive chairs in the stack. Because the cross pieces 16 and 24 conform approximately to the curvature of the seat 10, it is possible to design the entirety so that the vertical spacing between successive chairs will be substantially a minimum.

Figure 3:
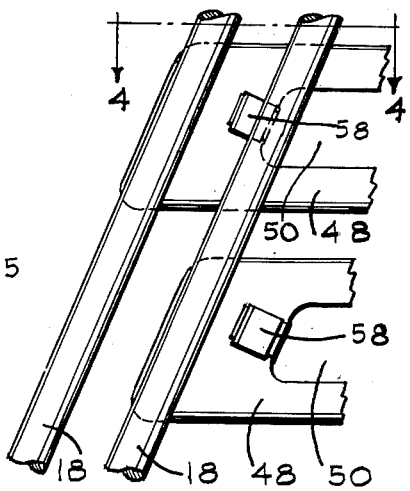
FIGURE 3 is a detail of the interengaging portions of two superimposed chairs, viewed as from line 3—3 of FIGURE 2.
Figure 4:
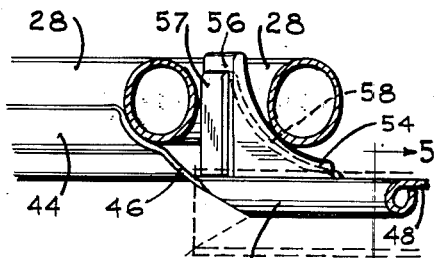
FIGURE 4 is a section on an enlarged scale, on line 4—4 of FIGURE 3.

Referring principally to FIGURES 3, 4, and 8, part of the metal removed to define the window 30 is turned back at each end along a line parallel to the adjacent leg. The metal turned back then extends outwardly and is curved toward the center of the chair as clearly indicated at 54 in FIGURE 4. The arcuate portion 54 is embedded in a plastic block 56 and a projecting portion of the metal is turned in at 57 and may extend back to contact the plate 48 and greatly strengthen the load bearing portion 54. The plastic block 56 is penetrated by the metal ear 54 and a relatively thin layer of plastic at 58 remains interposed between the ear 54 and the leg 28 to carry the load.

Upon reference to FIGURE 4 it will be noted that this contact is at a radius extending diagonally away from the fore-and-aft center of the chair and away from the left- to right-center of the chair so that the leg 28 is pressed diagonally against the approximate center of the chair by the pressure of the plastic at 58. This provides a slight wedging action at each of the four corners of the superimposed chair and effectively avoids any looseness or wobbling, even in a very high stack of superposed chairs. At the same time, the angle at which the wedging action occurs is large enough so that a gentle lifting on the top chair will disengage the parts when the chairs are to be unstacked.

*Ganging*

The type of chair illustrated is very popular for auditoriums, churches and schools, and is replacing the folding chair for many uses. Such chairs can be stacked away for storage in somewhat smaller floor space than the folding chairs, and the stacking involves an amount of physical effort not materially different from that required to fold and stack folding chairs. Also the risk of pinched fingers and the noise and delay, when folding chairs are folded by inexperienced people, is avoided. But the principal advantage is the much greater degree of comfort, because the individual chair can be made substantially as comfortable as any chair, while the process of folding calls for seat shapes and back shapes that are much less well adapted to human occupancy.

When such chairs are set out on the floor for the use of a class or audience of substantial size, it is desirable to connect them together in lateral rows, with the chairs firmly affixed to each other so that they will not get pushed around and disarranged by the users. More particularly, it is desirable to effect such ganging connections securely and without looseness or rattling and at the same time have nothing projecting from the individual chair, when it is used in separated condition, that might injure the stocking or leg of a person or child passing close beside it.

Figure 2:
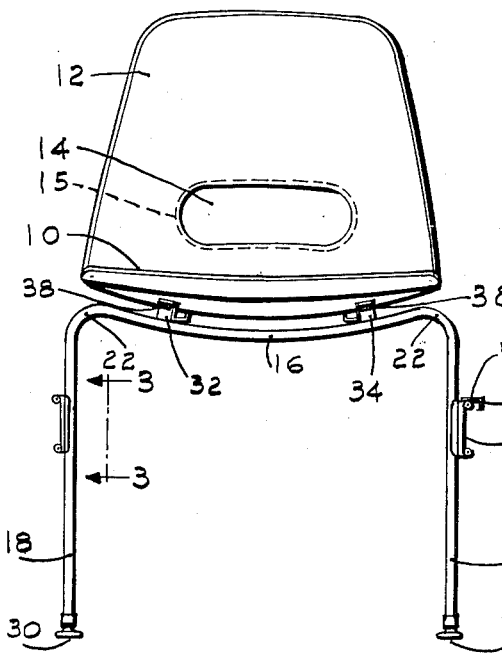
Figure 5:
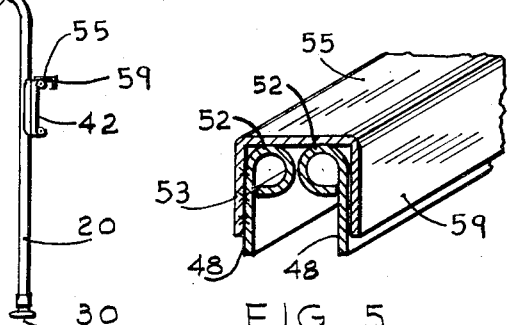
FIGURE 5 is a fragmentary view in section on line 5—5 of FIGURE 4 indicating a permanently affixed ganging clip for anchoring two chairs to each other, side by side.

The ganging clip illustrated in FIGURES 1, 2 and 5, and indicated in FIGURE 4 is a simple inverted channel, opening downwardly. One leg 53 of the channel lies inside the plate 48 of the cross piece of the chair and is spot welded to it. The back 55 of the channel extends horizontally outward from that chair and the outer leg 59 of the channel extends down to define a space just sufficient to receive the bead 52 of the next chair, with both beads in direct engagement to eliminate rattling.

Assembly of the chairs in ganging relation merely involves lifting the chair carrying the channel about an inch and lowering it into position with the outer channel leg 59 hooked over the side brace of the adjacent chair. This brings the parts into assembled relationship without anything further, and a mere lifting of the chair carrying the channel will separate the chairs again.

As best indicated in FIGURE 4, the ends of the channel extend up to a point where sliding movement of the bead 52 in the channel is prevented because the arcuate portion 46 of the cross brace wedges against the end of the channel and prevents material sliding movement.

The ganging clip illustrated in FIGURES 1, 2, and 5 is simple and cheap and effective, but it does constitute a slight asymmetry when the chair is used by itself and it does project out just a little so that ladies' stockings or little children's knees might encounter the end of it and be more or less injured. In FIGURES 6 and 7 I have illustrated an alternative clip, such that when the chairs are not ganged the individual chair, as seen in FIGURES 1 and 2 does not have anything projecting beyond the beads 52 anywhere. The channel 60 has downwardly extending legs 62 and 64 adapted to clamp the beads 52 substantially as in FIGURE 5. If it is desired to have the lateral spacing of the chairs just a trifle wider, it is a simple matter in forming the channel to turn down an ear 66 out of the back 68. Where the installation is to be relatively permanent, there is no objection to a simple bolt 70 passing through registering holes 71 in the legs 62 and 64 and the brace plates 48 and fastened with an ordinary nut 72. Such a fastening permits the bolt 70 to prevent any sliding movement between the channel and either of the clamped braces and therefore the ends of the channels 60 need not extend quite as far as indicated in FIGURE 4. This makes it a little easier to set them in place by hand.

Where relatively frequent disconnection is desirable, I prefer the modification of FIGURE 9 in which the same channel 60 may have added to it a leaf spring 74 riveted on at 76 and carrying a locking pin 78 and an ear 80 to permit easy manual withdrawal of the locking pin.

With each leg of the channel thus equipped, and the pins 78 passing through the channel legs and through registering holes in the brace plates 48, the assembled connection is of equal strength and rigidity with that of FIGURE 7, but a thumb slipped under either ear 80 can easily withdraw one of the locking pins, and the operator need only lift up a little to lift the other chair and the channel, and disconnect the chairs.

Referring now to FIGURES 10 and 11, the channel 82 differs from the channel of FIGURE 5 in having a turned in flange 84 at the lower end of one leg 86 while the other leg 88 ends a little bit above the adjacent lower edge of the brace plate 48. In the assembled position of FIGURE 10 the chairs are restrained from relative movement as effectively as with the construction of FIGURES 4 and 5. To disconnect the chairs it is necessary to lift the chair on the right so that the channel is moved directly upward, and then remove the chair on the left. Subsequently the channel could be allowed to remain in the dotted line position of FIGURE 11, but it can also be rotated about the lower edge of the plate 48 in a clockwise direction into the full line position and beyond, so that it can be completely removed and laid aside. To reassemble, the channel is positioned in the full line position of FIGURE 11 and moved to the dotted line position and the two chairs are then juxtaposed.

In FIGURES 12 and 13 the channel 90 is adapted to engage the lower beads 52 of the cross braces. The hook 84 is replaced by a narrow arcuate portion 92 subtending about 140° around the axis of the enclosed bead 52. As in FIGURES 10 and 11 the chairs are restrained from any relative movement except for lifting the chair on the right which will withdraw the chair on the right and the channel from engagement with the chair on the left. Then rotation clockwise to let the dihedral crotch at 91 ride on the edge of plate 48 lets the trough 92 move down and out from under the bead 52.

In FIGURE 14 I have illustrated a ganging clamp that operates on the legs of the chairs rather than on the cross braces. Twin plates 94 are united, as by spot welding. At each end each plate curves away from the other as at 96 into position to engage an adjacent leg and then bulges outward into a receiving clamp 98 embracing about 150° of the clamped leg. A simple leaf spring 100, affixed to one of the plates 94, has a hook portion 102 positioned to snap under the edge of a cross brace plate 48, and a lateral ear 104 for convenient disengagement by hand. The entire assembly is simply dropped down between the legs of the juxtaposed chairs until the clamps 98 ride on the legs and the hook 102 has snapped under the cross brace.

In FIGURES 15 and 16 I have illustrated plates 106 similar to the plates 100 and similarly united. At each end of each plate I provide a resilient upward extension 108. The extensions 108 extend upwardly between the clamped chairs and diverge gradually to engage the edges 110 of the fiberglass seats 10. At the level of the edges 110 each riser is provided with a shallow groove 112 that registers with the edge of the chair seat. Above the groove 112 the risers continue upwardly at 118 for a suitable distance to support a conventional chair arm 120.

The chair arm clamping assembly of FIGURES 15 and 16 might be held in position in the same way as the simple clamp of FIGURE 14, but I prefer to provide greater strength. At the lower edge of each plate 106 I provide a horizontal flange 122 adapted to ride on the adjacent bead 52. Portions of the flanges 122 near the ends of the brace are extended down to define ears 124 that clamp the plates 48 firmly together as in FIGURE 5. The whole assembly can be prevented from moving upwardly by spring clips 100 identical with that shown in FIGURE 14 except that I prefer to provide two such clips, one on each side for firmer and more dependable engagement under working load. I prefer not to extend the ears 124 far enough to engage the arcuate portions 46 of the cross braces. Instead the outer edges of the risers 108 are extended and provided with short contact ears 126 at their ends, which engage the adjacent chair legs to prevent relative sliding movement of the connected chairs.

Figure 17:
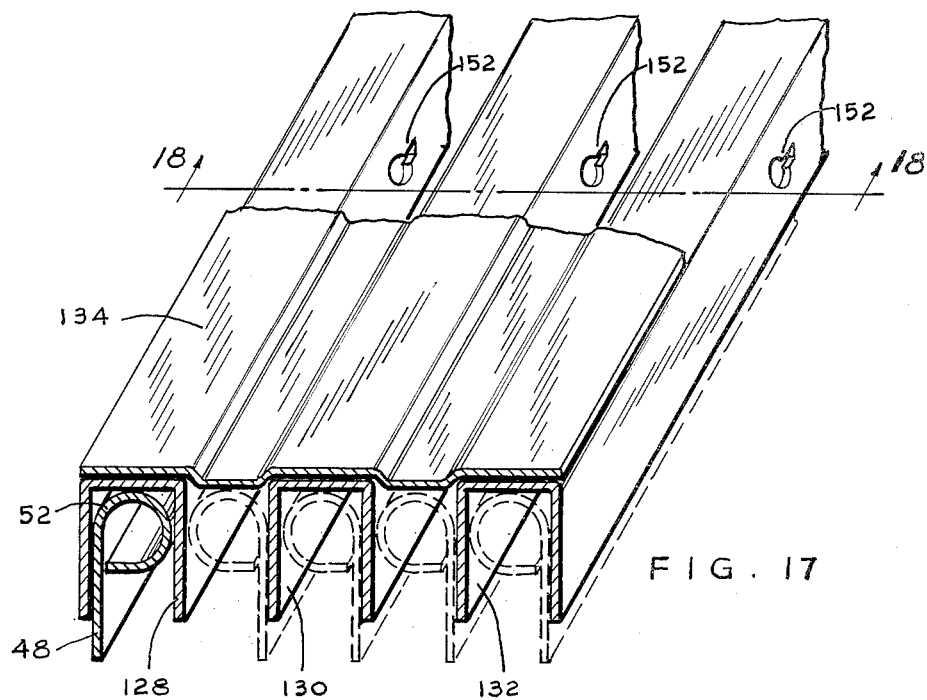
FIGURE 17 is a view of an alternative clip adapted to clamp the chairs in the same way as the clip of FIGURE 6, with the spacing between the chairs adjustable to any one of four different spacings.
Figure 18:
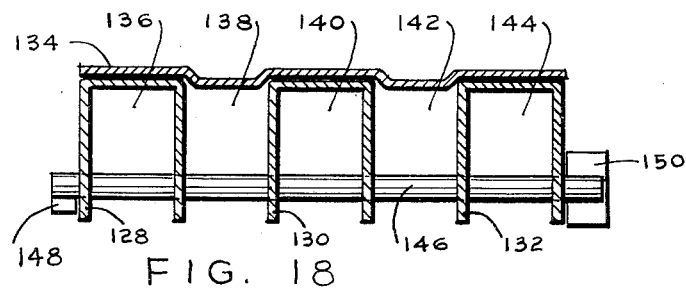
FIGURE 18 is an end view of the clip of FIGURE 17, in partly assembled position.
Figure 19:
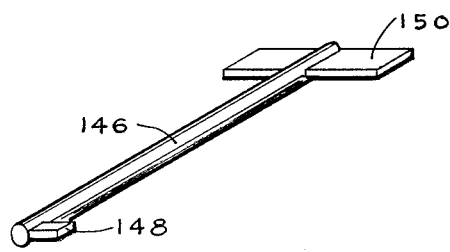
FIGURE 19 is a perspective view of one suitable fastening member for the clip of FIGURE 17.

Referring now to FIGURES 17, 18, and 19, I have indicated a multiple channel construction convenient for effecting a wide variety of chair arrangements in a large auditorium that needs to be rearranged at times for different types of patrons. The lateral spacing between adjacent chairs is an important matter of comfort and freedom from personal contact between the occupants. I have indicated three duplicate downwardly opening channels 128, 130, and 132. These are connected into a unitary rigid structure by the cover plate 134 to which each of the channels may be spot welded. The spacing is such that five receiving openings 136, 138, 140, 142 and 144, are provided, all of identical width and all of the width to receive just one bead 52 in firmly held relationship, with the adjacent channel edges terminating at a slightly higher level than the clamped plate 48.

In FIGURE 17, I have indicated this entire assembly set down over a bead 52 in the left hand channel 128. The side brace of another chair can now be positioned in any one of the four grooves 138, 140, 142 and 144 in four different spacings with respect to the first bead 52. This provides four different space relationships between adjacent chairs, each successive spacing wider than its predecessor. I have indicated suitable means for fastening the parts against sliding movement or withdrawal. The pin 146 has a small key lug 148 at one end and a wing handle 150 at the other. It can be inserted through key hole openings at 152 through all the channels and identical registering openings in the plates 48, and then rotated to move the lug 148 out of register with the adjacent slot.

The embodiment illustrated in FIGURES 20 to 23 inclusive appears to provide a maximum of rigidity and strength against relative displacement of the connected chairs. In the assembled position of FIGURE 20, the mated channels 154 and 156 ride on the upper beads 52 of the cooperating side braces, and their remote ends abut the chair legs, having shallow arcuate depressions 158 to keep the parts in register. At the middle, the legs of the channel 156 have male protuberances 160 received in female circular sockets 162 in the adjacent ends of the side legs of the channel 154. Above the pivotal articulation thus provided, the parts terminate at 164, with a generous clearance, enough to permit downward movement of the pivotal connection to be limited by engagement of the backs of the channels with the supporting beads 52, and to avoid pinching the fingers of the user. Below the pivotal connection, the channel legs must also be cut away as indicated at 166 for the channel 156 and 168 for the channel 154 so that the pivot can move up. Counter-clockwise rotation of the left channel 156 and simultaneous clockwise rotation of the right hand channel 154, each around its end contact with the legs at its outer end as a fulcrum, into the dotted line position of FIGURE 20, permits both parts to simply fall apart and lie in the hands of the person removing them.

Because of the toggle action there will be a small compression load in the channels in assembled position, and both chairs will be very firmly braced against even the slightest shifting fore-and-aft.

Because this compression force tends to keep the parts in assembled relationship there is no real need for any other retaining means. However, it is a wise precaution, in case of an occasional slight defect in manufacture in the locking device or one of the chairs, to provide a very small bulge 170 in each leg of each channel near its lower edge. The bulge is preferably of such configuration that as it slides over the beads 52 the leg of the channel is deflected out a few thousandths of an inch and comes back in again to the assembled position illustrated in FIGURE 21.

FIGURES 22 and 23 illustrate one relatively simple procedure for forming the channels of FIGURES 20 and 21 from simple, flat pieces of sheet metal with no complicated die-forming operations involved. The blank 172 is first stamped out with the configuration illustrated in FIGURE 22 and then folded along fold lines 184. The terminal plate 180 is welded at 181 to the web 182 of the formed channel. This completes the left hand channel assembly, and the right hand channel assembly 154 is a duplicate except that its butt has the circular concavities at 162 instead of circular protuberances 160. It will be obvious that the mating channel members could easily be connected permanently by a pivot at the same axis as the center of the protuberance 160, but this would add nothing to the effectiveness of the final assembly, and would involve a slight additional expense and produce a slightly more cumbersome bit of equipment to store when not in use.

Others may readily adapt the invention for use under various conditions of service by employing one or more of the novel features disclosed, or equivalents thereof. As at present advised, with respect to the apparent scope of my invention, I desire to claim the following subject matter:

1. Seating equipment comprising a plurality of identical chairs; each chair including a seat member and four supporting legs; said legs being laterally separated by a distance greater than the width of said seat; the space between said legs being unobstructed to permit the seat of another chair to lie between the legs of a superposed chair; whereby chairs placed in side by side abutment on the same level have their seats laterally spaced apart; and separate quick-detachable clamping means insertable from above through the space between the seats of chairs arranged side by side, for clamping the chair frames to hold the chairs in alignment with each other; the two legs on each side of a chair being interconnected by a side brace running from a front leg to a back leg; said side braces lying outside the fore-and-aft plane of the braced legs, to permit the legs of a chair below to be received between the front and rear legs of a chair above; said clamping means clamping the main portions of the adjacent side braces of two juxtaposed chairs in parallelism with each other and with said clamping means; said braces each comprising a main portion parallel to the fore-and-aft plane of the braced legs; offset end portions offset in the same direction and extending into abutment with the braced legs and permanently affixed to said legs, as by spot-welding; said clamping means having parallel, spaced flanges positioned to receive between them the main portions of the adjacent side braces of two juxtaposed chairs; and locking means adapted to pass through both of said flanges and both of the side braces clamped thereby, in a direction normal to the planes of said flanges and braces, to lock said flanges and both said chairs against relative fore-and-aft movement; said flanges and braces having registering apertures to receive said locking means.

2. Seating equipment comprising a plurality of identical chairs; each chair including a seat member and four supporting legs; said legs being laterally separated by a distance greater than the width of said seat; the space between said legs being unobstructed to permit the seat of another chair to lie between the legs of a superposed chair; whereby chairs placed in side by side abutment on the same level have their seats laterally spaced apart; and separate quick-detachable clamping means insertable from above through the space between the seats of chairs arranged side by side, for clamping the chair frames to hold the chairs in alignment with each other; the two legs on each side of a chair being interconnected by a side brace running from a front leg to a back leg; said side braces lying outside the fore-and-aft plane of the braced legs, to permit the legs of a chair below to be received between the front and rear legs of a chair above; said clamping means clamping the main portions of the adjacent side braces of two juxtaposed chairs in parallelism with each other and with said clamping means; said braces each comprising a main portion parallel to the fore-and-aft plane of the braced legs; offset end portions offset in the same direction and extending into abutment with the braced legs and permanently affixed to said legs, as by spot-welding; said clamping means having parallel, spaced flanges positioned to receive between them the main portions of the adjacent side braces of two juxtaposed chairs; each main portion adapted to be received in said clamping means having a main plane portion and an outwardly offset bead along one edge only of said main plane portion; said clamping means including a channel having a back portion adapted to span said main plane brace portions; and parallel legs normal to and integral with said back portion; a wider one of said legs extending across said main plane brace portion and having a narrow retroverted flange curving in around the edge of said main plane brace portion; said retroverted flange extending diagonally in and back toward said back portion, to permit said channel to swing pivotally around the edge of said main plane brace portion; a narrower opposite one of said legs being narrower than said main plane brace portion; the remote edge of said opposite narrow leg being spaced from the pivotal edge of said main plane brace portion far enough to clear the bead along the opposite edge of said main plane brace portion, for removal of said clamping means.

3. Seating equipment comprising a plurality of identical chairs; each chair including a seat member and four supporting legs; said legs being laterally separated by a distance greater than the width of said seat; the space between said legs being unobstructed to permit the seat of another chair to lie between the legs of a superposed chair; whereby chairs placed in side by side abutment on the same level have their seats laterally spaced apart; and separate quick-detachable clamping means insertable from above through the space between the seats of chairs arranged side by side, for clamping the chair frames to hold the chairs in alignment with each other; the two legs on each side of a chair being interconnected by a side brace running from a front leg to a back leg; said side braces lying outside the fore-and-aft plane of the braced legs, to permit the legs of a chair below to be received between the front and rear legs of a chair above; said clamping means clamping the main portions of the adjacent side braces of two juxtaposed chairs in parallelism with each other and with said clamping means; said braces each comprising a main portion parallel to the fore-and-aft plane of the braced legs; offset end portions offset in the same direction and extending into abutment with the braced legs and permanently affixed to said legs, as by spot-welding; said clamping means having parallel, spaced flanges positioned to receive between them the main portions of the adjacent side braces of two juxtaposed chairs; each main portion adapted to be received in said clamping means having a main plane portion and an outwardly offset bead along one edge only of said main plane portion; said clamping means including a channel having a back portion adapted to span the adjacent main plane brace portions of two chairs set side by side; said back abutting the edges of said main plane brace portions; said channel having a first leg engaging one of said main plane brace portions; said first leg having a curved terminal flange remote from said back; said curved flange being shaped to cup the bead along the edge of said main plane brace portion and maintain a pivotal guidance for swinging said entire channel around said bead as a fulcrum; said channel having a second leg along the remote edge of said back; the reentrant dihedral angle between said back and said second leg being spaced from the axis of said curved flange far enough to let said curved flange swing past said bead, when the unbeaded edge of said main plane brace portion is seated in said reentrant angle to serve as a fulcrum at the other side.

4. Seating equipment comprising a plurality of identical chairs; each chair including a seat member and four supporting legs; said legs being laterally separated by a distance greater than the width of said seat; the space between said legs being unobstructed to permit the seat of another chair to lie between the legs of a superposed chair; whereby chairs placed in side by side abutment on the same level have their seats laterally spaced apart; separate quick-detachable clamping means insertable from above through the space between the seats of chairs arranged side by side, for clamping the chair frames to hold the chairs in alignment with each other; said clamping means having downwardly facing abutment means adapted to engage the chair structure below the seat level and support said clamping means; said clamping means including riser means extending up between the seats of the clamped chairs; and arm-rest means above the seats of said chairs, supported on said riser means; said riser means including resilient abutment means engaging the spaced adjacent edges of the seats of the clamped chairs to hold said riser means in vertical position.

5. Equipment according to claim 4 in which said riser means includes two risers adjacent opposite ends of said clamping means; and separate abutment means included in each riser.

References Cited in the file of this patent

UNITED STATES PATENTS

| | | |
|---|---|---|
| 1,198,726 | Huntley | Sept. 19, 1916 |
| 2,893,469 | Eames | July 7, 1959 |
| 2,895,540 | Mackintosh | July 21, 1959 |
| 2,952,300 | Cohen | Sept. 13, 1960 |
| 2,980,454 | Thaden | Apr. 18, 1961 |

FOREIGN PATENTS

| | | |
|---|---|---|
| 874,927 | France | June 1, 1942 |
| 553,425 | Belgium | Dec. 31, 1956 |
| 1,062,407 | Germany | July 30, 1959 |